United States Patent Office 2,747,011
Patented May 22, 1956

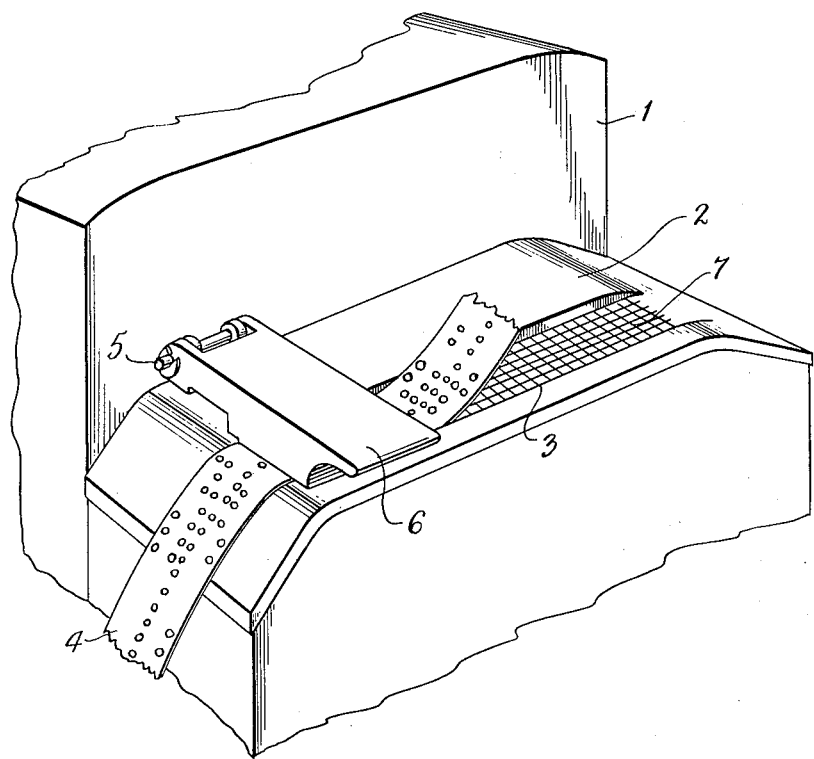

2,747,011
SCANNING APPARATUS FOR PERFORATED CODE TAPE

Otto Moser, Bern, Switzerland

Application January 12, 1955, Serial No. 481,421

Claims priority, application Switzerland January 15, 1954

2 Claims. (Cl. 178—1)

My invention relates to apparatus for the scanning of perforated code tape for telegraph purposes. Such apparatus are used, for instance, for automatically controlling the transmitter of a teleprinter system in accordance with messages punched into the tape in the form of code combinations.

To secure a correct sensing of the punched hole combinations in the scanning apparatus, the spacings between the perforations of the tape must not exceed a given tolerance from the correct value. For that reason the perforated tape, from time to time as well as after occurrence of trouble, must be checked for accuracy of hole spacing. Conventionally, this is done with the aid of code-tape gauges. Such a gauge, for instance, consists of a metal plate on which the center points of the holes to be punched are marked. For checking, the tape is placed into a guide mounted on the plate. The center points of the punched holes are then supposed to register with the points marked on the gauge plate. Any deflections are readily discernible by inspection.

Tape gauges of this kind generally form part of the special tools required for proper operation of teleprinter equipment, and it may happen that such a gauge is not as readily available or not as speedily applicable as may be desired for securing uninterrupted transmission.

It is an object of my invention, therefore, to eliminate such causes of delay and to do away with the necessity of resorting to any extraneous tool or gauge for checking the code tape.

To this end, and in accordance with a feature of my invention, I provide a code-tape scanning apparatus, such as the tape-sensing portion of a teleprint transmitter, with a tape guide-way that is only partly covered by the tape-feed and sensing portion of the apparatus, and I equip the remaining, uncovered portion of the guide-way with a network of markings composed of two groups of lines, one group extending longitudinally, i. e., in the tape-feed direction, and the other perpendicularly thereto. The spacing of the lines within each group corresponds to the correct spacing between the longitudinal rows of perforations and their lateral spacing respectively on the tape, so that the distances between the intersection points of the network is in accordance with the correct center spacing of the tape perforations.

An example of a code tape scanning apparatus is shown on the drawing by a perspective illustration of the code-scanning portion of a teleprint transmitter.

The teleprint transmitter 1 has a surface member 2 which forms a table top and is equipped with a guide-way 3 for the perforated tape that, while traveling, is to control the operation of the transmitter. Aside from its code perforations, the tape has a longitudinal row of evenly spaced feed holes to cooperate with a feeding mechanism (not shown) which has a sprocket wheel engaging the feed holes from below. A holder 6 pivoted about a pin 5 extends across the surface member 2 and across the guide-way 3 in order to maintain the tape 4 during its travel in proper engagement with the guide-way and the drive mechanism. The holder 6 can be tilted upward about the pivot pin 5 for inserting the code tape.

The guide-way 3 in the illustrated example consists of a flat-bottom groove that extends all the way across the top surface of member 2. For checking the spacing between the holes of the code tape 4, the bottom surface of the guide-way 3 is provided with a network 7 of lines. One group of these lines extends longitudinally, i. e., along the travel direction of the tape; and the spacing of these lines from each other is in accordance with the spacing of the signal-denoting perforations of the tape. A second group of lines extends at a right angle to the travel direction; and the spacing of these lines from each other is in accordance with the correct spacing of the signal-denoting holes pertaining to the individual code combinations. The points of intersection of the two groups of lines indicate the correct center points of the punched holes in the tape. The marking lines of the network 7 may be pressed or engraved into the material of the surface member. However, the marking may also consist of series of dots or circles.

During the operation of the transmitter, while the code tape 4 is passing from the left through the guide-way, a portion of the tape can be held temporarily against the gauging network so that any discrepancy between the actual perforations and the required accurate position thereof can readily be checked by the operator. The operation of the transmitter need not be interrupted for this purpose as a loop of tape may be permitted to collect between the holder 6 and the checking area.

It will be recognized that by virtue of the invention the provision of separate code tape gauges is unnecessary and that a checking may be easily performed at any desired time.

I claim:

1. Scanning apparatus for perforated code tape, comprising a surface member having a guide-way forming a travel path for the tape to be scanned, a holder disposed on said member and extending across said guide-way for holding the tape in said guide-way, said guide-way being longer in the tape travel direction than said holder so as to have a visible portion beside said holder, said portion of said guide-way having a network of two groups of marking lines extending in said direction and perpendicular thereto respectively, the lines in each group being spaced from each other in accordance with the hole spacing of the tape, and said groups of lines having intersection points coincident with the correct center spacing of the tape holes, whereby said device inherently forms a tape-hole gauge.

2. Scanning apparatus for perforated code tape, comprising a surface member having a longitudinal groove forming a guide-way for the tape, tape-feed means located near one end of said groove and comprising a removable holder extending across said groove and registering therewith for holding the tape in said groove, said groove having a longitudinal flat-bottom portion extending from beneath said holder in the tape feed direction, and two groups of grooved lines located on said bottom portion and having a longitudinal group and a perpendicular group of lines spaced from each other in accordance with the hole spacing of the tape, and said groups of lines having intersection points coincident with the correct center spacing of the tape holes, whereby said device inherently forms a tape-hole gauge.

No references cited.